United States Patent [19]
Le Salver

[11] 3,805,911
[45] Apr. 23, 1974

[54] VEHICLE PROVIDED WITH AN ENERGY ABSORBING DEVICE

[75] Inventor: Robert Le Salver, Maisons-Laffitte, France

[73] Assignees: Automobiles Peugeot, Paris; Regie Nationale Des Usines Renault, Billancourt, both of, France

[22] Filed: Apr. 4, 1972

[21] Appl. No.: 240,377

[30] Foreign Application Priority Data
May 3, 1971 France .............................. 71.15844

[52] U.S. Cl................................. 180/91, 180/70 P
[51] Int. Cl............................................. B60r 21/00
[58] Field of Search............. 180/95, 82, 103, 70 P, 180/64, 82 R, 91; 296/65 A; 74/492

[56] References Cited
UNITED STATES PATENTS

| | | | |
|---|---|---|---|
| 2,517,860 | 8/1950 | Forgy | 180/91 |
| 3,635,314 | 1/1972 | Mazelsky | 74/492 |
| 2,796,943 | 6/1957 | Rolt et al. | 180/64 R |
| 2,381,399 | 8/1945 | Brown | 180/70 PX |

*Primary Examiner*—David Schonberg
*Assistant Examiner*—Terrance L. Siemens
*Attorney, Agent, or Firm*—Burns, Doane, Swecker & Mathis

[57] ABSTRACT

An automobile vehicle having a rigid occupant compartment and a second compartment located at one end of the vehicle and containing at least partly the engine-drive unit. An energy absorbing device is interposed between a part of the engine-drive unit and the occupant compartment.

8 Claims, 5 Drawing Figures

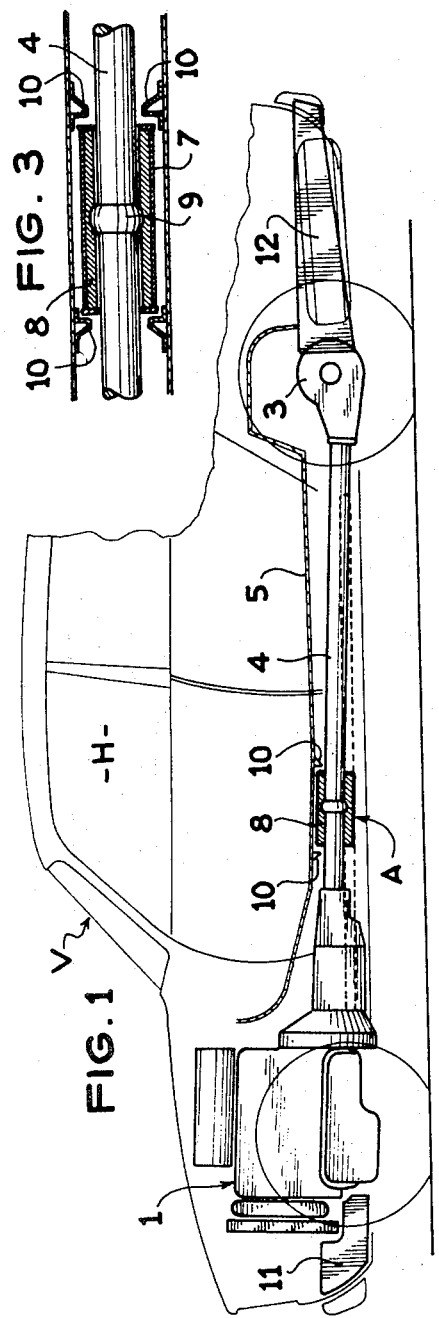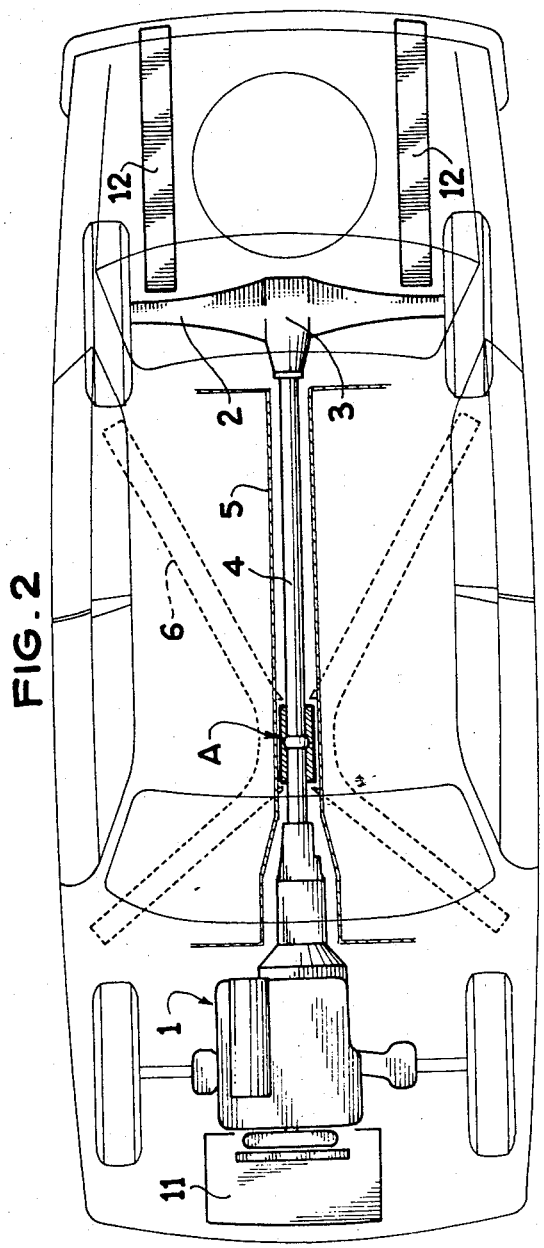

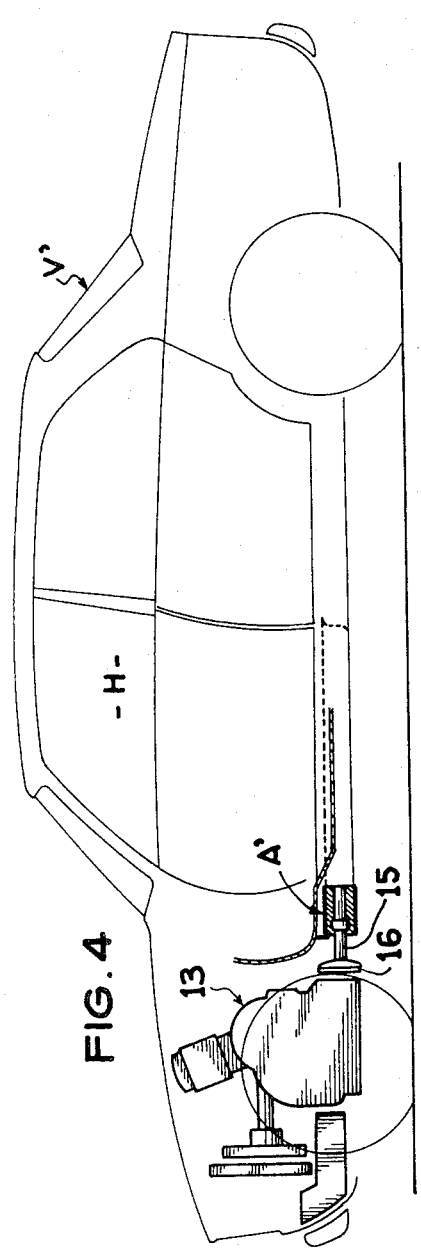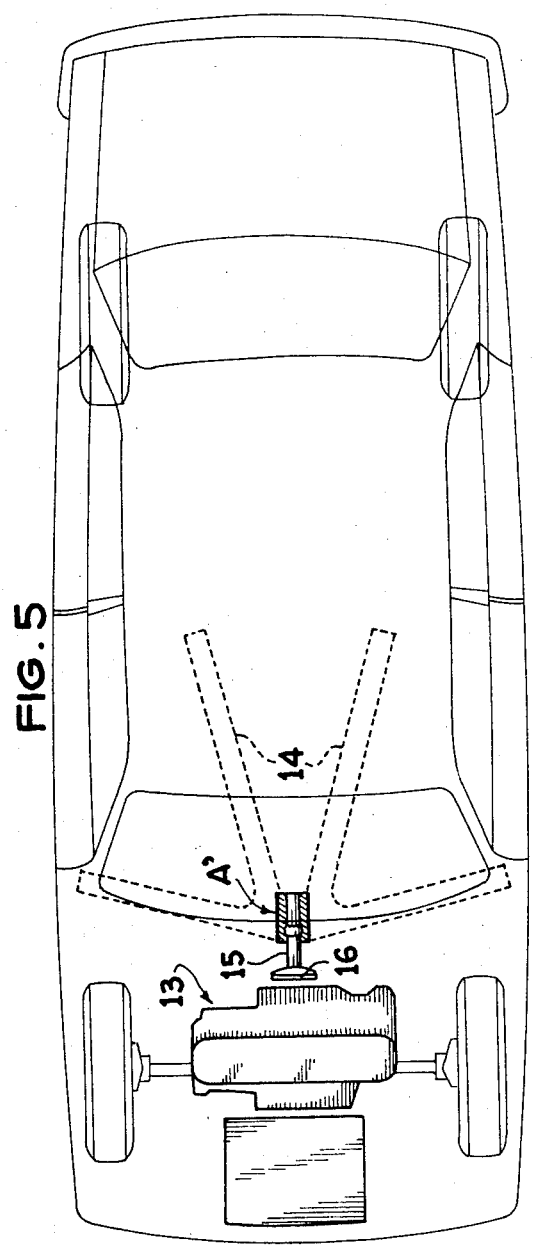

VEHICLE PROVIDED WITH AN ENERGY ABSORBING DEVICE

The present invention relates to automobile vehicles and in particular to safety devices affording an improved protection to the occupants of a vehicle in the event of a violent shock.

It is known that automobile vehicles are at present designed in such manner that, in the event of an accident, a maximum amount of the kinetic energy involved is absorbed and dissipated by the crushing of front and/or rear parts while it is ensured that the occupant compartment or central cell remains as far as possible intact. Unfortunately, the presence of certain mechanical units, such as the power unit, limits the possibilities of crushing and consequently of energy absorption and serious deformations of the cell are observed which are caused by the penetration therein of these mechanical units, even in the case of shocks occurring at relatively low speed and in particular in the case of a shock against a post or tree. Now, experience has shown that although efficient interior protecting means, such as safety belts, inflatable bags or walls, exist, the wounds of the occupants are reduced to a minimum if the occupant compartment remains roughly intact even when it has undergone considerable decelerations. It is indeed clear that the aforementioned protecting means can only be really effective if the passenger or occupant compartment proper is not too deformed.

Moreover, energy absorbing devices are known which are incorporated in the seats or the steering columns and are designed to result in a large dissipation of the kinetic energy. However, their efficiency is, as before, dependent on the strength or resistance of the occupant compartment.

An object of the present invention is to push back the speed threshold beyond which, in a shock, the occupant compartment undergoes damage which adversely affects the safety of the occupants by increasing the capacity of the structure to dissipate energy for a given magnitude of the crushing.

The invention provides an automobile vehicle comprising a rigid occupant compartment and an engine-drive unit at least partly disposed in a compartment in front of, or at the rear of the occupant compartment, wherein an energy absorbing device is interposed between a part of the engine-drive unit and the occupant compartment. Clearances are of course provided to allow the necessary movements in normal use of the vehicle between the occupant compartment and the engine-drive unit so that the energy absorbing device is operative only when needed.

This additional absorption of energy enables the occupant compartment to be protected in a more effective manner so that the danger in the event of a violent shock is diminished. Many embodiments may be envisaged, depending on the design of the vehicle. Two embodiments will now be described in more detail with reference to the accompanying drawing in which:

FIGS. 1 and 2 are elevational and plan views of a vehicle having a front engine and a rear drive according to the invention;

FIG. 3 is a detail view, on an enlarged scale, of the energy absorbing device shown in FIGS. 1 and 2, and FIGS. 4 and 5 are elevational and plan views of a vehicle having a front engine and front drive arranged in accordance with the invention.

FIGS. 1 and 2 show a vehicle V comprising a rigid cell or passenger or occupant compartment H, an engine-gearbox unit 1 located in the front part of the vehicle and a rear drive axle 2 having a differential 3. The transmission between the gearbox and the differential 3 is through the agency of a transmission shaft disposed in a connecting tube 4 which is disposed in a tunnel 5 on the longitudinal axis of the floor of the vehicle. This assembly comprising the engine-gearbox unit, transmission shaft, differential and rear axle, constitute the engine-drive unit of the vehicle.

According to the invention, a kinetic energy absorbing device A, which may be of any suitable type, is disposed between the connecting tube 4 and the tunnel 5. Advantageously, this device A is placed at the intersection of ribs 6 reinforcing the floor which are arranged in the form of an X in the illustrated embodiment.

FIG. 3 shows one embodiment of the energy absorbing device which may be employed. This device comprises a rigid case 7 enclosing a sleeve 8 of deformable material disposed coaxially of the connecting tube 4 and a drive fit on an enlarged annular portion 9 whose outside diameter exceeds the inside diameter of the sleeve, so that displacement of the enlarged portion relative to the sleeve requires a predetermined high force. Preferably, the sleeve is composed of polyurethane as taught in French Patent No. 1,566,533 filed by the Applicants. At each end of the device A horseshoe-shaped stirrups or rings 10 are fixed inside the tunnel and constitute abutments as concerns the longitudinal movements between the connecting tube 4 and the floor which exceed limits which are reached only in the event of an accident.

The device just described operates in the following manner:

In normal vehicle use, the clearances between the connecting tube 4 and the device A, on one hand, and the tunnel 5 and the stirrups 10 on the other, are sufficient to allow relative movements or play without risk of contact. These clearances are of course different according as the rear differential is suspended or unsuspended.

In the case of a shock on the front of the vehicle, the front compartment of the vehicle is crushed and absorbs a part of the kinetic energy until there is a direct thrust on the motor-drive unit. In the arrangement according to the invention, the thrust on the mechanical assembly is transmitted by the connecting tube to the device A which abuts the stirrup 10 located to the rear thereof. The relative displacement between the connecting tube 4 and the tunnel 5 is then considerably braked or retarded and is accompanied by a large absorption of energy. In this way, the limits beyond which the passenger or occupant compartment is no longer safeguarded is very substantially pushed back, even if the impact occurs against a tree or a post.

In the case of a shock at the rear of the vehicle, the procedure is the same, but in this case the rear compartment is deformed and the impact is transmitted by the rear differential and possibly the spare wheel of the vehicle if the precaution has been taken of placing the spare wheel roughly in the same horizontal plane.

If the design of the body of the vehicle results in an excessively rapid crushing of the front and rear end parts there could possibly be provided a front structure 11 and rear structure 12 which absorb a certain amount of energy before intervention of the device A, but this result would be easily achieved by the usual conventional elements such as bumpers, side members, wheel wing or mudguard linings, etc.

As can be seen in FIGS. 4 and 5, the invention is also applicable to a vehicle V' having a front engine-drive unit 13 and front driving wheels. The energy absorbing device A' is then disposed under the front part of the floor, the stiffening ribs 14 of which may be arranged as shown in FIG. 5. In this embodiment, the whole of the device A' is fixed relative to the floor and its centre part 15 terminates at the front in at least one buffer or bearing plate 16 which faces the engine-drive unit 13 with sufficient clearance to allow in normal vehicle use play between the engine-drive unit and the energy absorbing device A' for accommodating normal movements of the engine relative to the body of the vehicle.

The energy absorbing device A' has of course the same function and operation as in the foregoing embodiment.

It will be understood that a completely similar arrangement could also be adopted in the case of an engine-drive unit disposed at the rear and driving the rear wheels. There could also be provided two energy absorbing buffers, such as 16, which are placed facing suitable bearing faces on the engine block and fixed, for example, on two floor reinforcing side members.

Having now described my invention what I claim as new and desire to secure by Letters Patent is:

1. An automobile vehicle having a longitudinal axis and comprising a rigid occupant compartment having a given high resistance to shock which acts substantially axially of the vehicle, a second compartment located at one end of the occupant compartment and having a resistance to shock less than said given resistance of the occupant compartment, an engine-drive unit disposed at least partly in the second compartment, the engine-drive unit being supported in a manner to be capable of undergoing normal movements relative to the occupant compartment in normal use of the vehicle and to be capable of undergoing a movement relative to the occupant compartment which is in excess of said normal movements upon shock which acts substantially axially of the vehicle on the second compartment and is capable of crushing the second compartment, and an energy absorbing device interposed between and in combination with a part of the engine-drive unit and the occupant compartment, said combination comprising said part of the engine-drive unit and occupant compartment and energy absorbing device allowing axial play between the engine-drive unit and the occupant compartment to accommodate said normal movements of the engine-drive unit but allow the energy absorbing device to act after said play is taken up to absorb energy when shock acting substantially axially of the vehicle causes crushing of the second compartment and a displacement of the engine-drive unit relative to the occupant compartment.

2. A vehicle as claimed in claim 1, wherein said play is allowed between said part of the engine-drive unit and the energy absorbing device.

3. A vehicle as claimed in claim 1, wherein the occupant compartment has a floor and the energy absorbing device is disposed in the vicinity of a reinforced region of the floor.

4. A vehicle as claimed in claim 1, wherein said play is allowed between the energy-absorbing device and the occupant compartment.

5. A vehicle as claimed in claim 1, wherein the second compartment is in the front part of the vehicle and the engine-drive unit is entirely disposed in the second compartment and the energy absorbing device is interposed between facing parts of the unit and occupant compartment.

6. A vehicle as claimed in claim 5, wherein the energy absorbing device comprises a buffer, a rod integral with the buffer, an enlarged portion on the rod, a sleeve of deformable material integral with the occupant compartment and engaged on the enlarged portion, the sleeve having a cross-sectional size less than the cross-sectional size of the enlarged portion.

7. An automobile vehicle having a longitudinal axis and a front part and a rear part, a rigid occupant compartment having a given high resistance to shock which acts substantially axially of the vehicle, the occupant compartment being interposed between said front part and said rear part, the front part and rear part having a resistance to shock less than said given resistance of the occupant compartment, an engine-drive unit being supported in a manner to be capable of undergoing normal movements relative to the occupant compartment in normal use of the vehicle and to be capable of undergoing a movement relative to the occupant compartment which is in excess of said normal movements upon shock which acts substantially axially of the vehicle on one of the front and rear parts, the engine-drive unit comprising an engine-gearbox assembly disposed in said front part, a differential mechanism disposed in said rear part of the vehicle, a transmission shaft operatively interconnecting the engine-gearbox assembly and differential mechanism, a connecting tube surrounding the transmission shaft and rigidly interconnecting the engine-gearbox assembly and differential mechanism, the occupant compartment having a floor and a tunnel integral with the floor and an energy absorbing device interposed between and in combination with the tube and the tunnel, said combination comprising the energy absorbing device and the tube and the tunnel allowing axial play between the tube and the tunnel to allow said normal movements of the engine-drive unit but render the energy absorbing device operative after said play is taken up to absorb energy when shock acting substantially axially of the vehicle causes crushing of one of the first and second parts and a displacement of the engine-drive unit relative to the occupant compartment.

8. An automobile vehicle having a front part and a rear part, a rigid occupant compartment interposed between said front part and said rear part, an engine-gearbox assembly disposed in said front part, a differential mechanism disposed in said rear part of the vehicle, a transmission shaft interconnecting the engine-gearbox assembly and differential mechanism, a connecting tube surrounding the transmission shaft and interconnecting the engine-gearbox assembly and differential mechanism, the occupant compartment having a floor and a tunnel integral with the floor and an energy absorbing device interposed between the tube and the tunnel, the energy absorbing device comprising an enlarged portion on the tube, a rigid case, a deformable sleeve engaged in the rigid case, the sleeve having an inside diameter less than the outside diameter of the enlarged portion, abutment means in the tunnel for stopping movement of the case relative to the tunnel when the connecting tube is displaced relative to the occupant compartment upon impact on an end of the vehicle of predetermined force.

* * * * *